US006322284B1

United States Patent
Bonardo et al.

(10) Patent No.: US 6,322,284 B1
(45) Date of Patent: Nov. 27, 2001

(54) ARRANGEMENT FOR FIXING A TUBULAR ELEMENT ON A STRUCTURAL ELEMENT OF A MOTOR VEHICLE BODY

(75) Inventors: Sandro Bonardo, Saint Ouen; Frédéric Rey, Paris; Gino Villata, Saint Ouen, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/508,963

(22) PCT Filed: Jul. 19, 1999

(86) PCT No.: PCT/FR99/01766

§ 371 Date: Oct. 5, 2000

§ 102(e) Date: Oct. 5, 2000

(87) PCT Pub. No.: WO00/05508

PCT Pub. Date: Feb. 3, 2000

(30) Foreign Application Priority Data

Jul. 20, 1998 (FR) .................................................. 98 09207

(51) Int. Cl.⁷ ...................................................... F16B 9/02
(52) U.S. Cl. ............................................ 403/348; 285/376
(58) Field of Search ...................................... 403/348, 252, 403/261, 263, 303, 329; 285/360, 376, 401, 914, 209, 208

(56) References Cited

U.S. PATENT DOCUMENTS

| 815,627 | * | 3/1906 | Oldham | 285/376 X |
| 1,507,230 | * | 9/1924 | Claflin | 285/376 X |
| 2,155,640 | * | 4/1939 | Bruce | 285/376 X |
| 2,638,258 | * | 5/1953 | Churchill | 403/252 X |
| 3,232,644 | * | 2/1966 | Pfeifer et al. | 403/348 X |
| 3,427,552 | * | 2/1969 | Sauer et al. | 403/348 X |
| 4,893,426 | * | 1/1990 | Bixler | 403/348 X |
| 6,058,804 | * | 5/2000 | Chang | 403/348 X |

FOREIGN PATENT DOCUMENTS

| 17691 | * | 1/1906 | (GB) | 285/376 |
| 2163475 | | 5/1988 | (GB) . | |

* cited by examiner

Primary Examiner—Lynne H. Browne
Assistant Examiner—David E. Bochna
(74) Attorney, Agent, or Firm—Liniak, Berenato, Longacre & White

(57) ABSTRACT

The invention concerns an arrangement (10) for fixing a tubular shift cylinder (12), between two mounting and locking positions in a motor vehicle body, comprising means for blocking the cylinder (12) in axial translation including, from the front rearwards, a transverse surface of the cylinder (12), axial elastic means, a body wall (20), pierced with an orifice (18), and a transverse eye mounting (34) of the cylinder (12) passing through a cutout (40) of the orifice (18) and enabling to immobilise the cylinder (12) axially when a rotation of the cylinder (12) locks it by squeezing the wall (20) between the support surface, the axial elastic means and the eye mounting (34). The invention is characterised in that the means immobilising the body (16) in rotation comprise a ferrule (56) linked with the cylinder (16) whereof an axial pin (68) passes through the wall (20) orifice (18) to be urged to stop against the wall (20) when the body (16) is locked in rotation, and whereof the axial teeth (72) bite into the wall (20) when the cylinder rotates (12) to immobilise it.

16 Claims, 5 Drawing Sheets

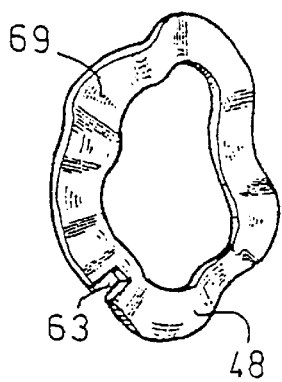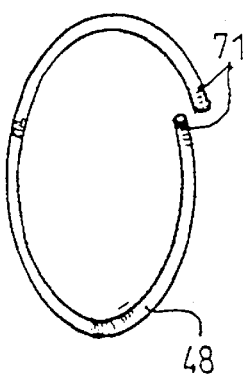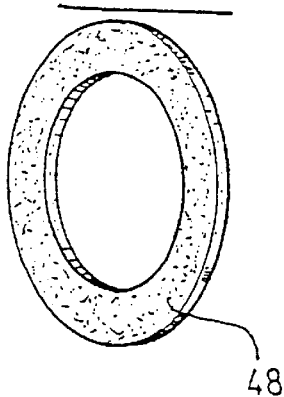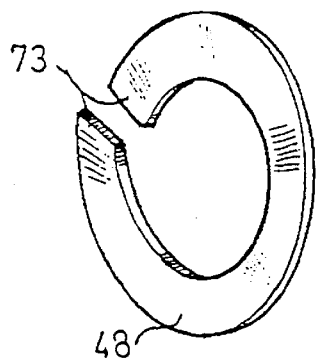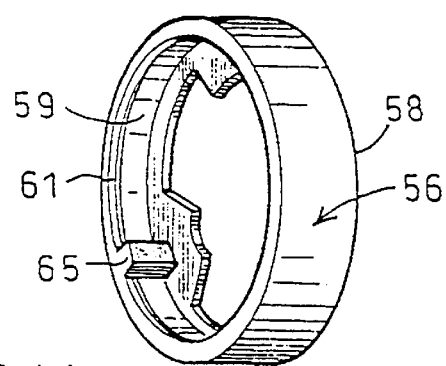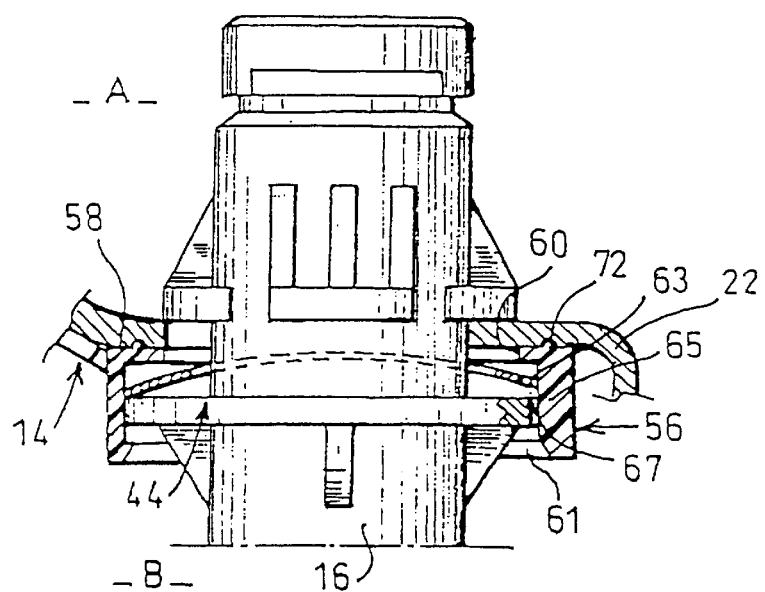

ARRANGEMENT FOR FIXING A TUBULAR ELEMENT ON A STRUCTURAL ELEMENT OF A MOTOR VEHICLE BODY

BACKGROUND OF THE INVENTION

1. Field of the Invention

The invention concerns an arrangement for the fixing, to a body structure element of a motor vehicle, of a hydraulic control cylinder.

2. Description of the Related Art

The invention concerns more precisely an arrangement for the fixing, to a body structure element of a motor vehicle, of a hydraulic control cylinder with a tubular axial shape overall, notably for controlling a clutch or brakes on the vehicle, of the type in which the control cylinder is movable between a position of mounting in the body structure element of the vehicle, and a position of locking with respect to the body structure element of the vehicle in which it is immobilised with respect to the body structure element of the vehicle by immobilisation means, of the type in which means of immobilising it with respect to translation along the axis of the cylinder include, from front to rear, an abutment surface which extends transversely from a main body of the cylinder, axial elastic means, a wall fixed to the body structure element which has in it an orifice, and at least one bracket, which extends transversely from the main body, which, on mounting, passes through a complementary cutout extending radially from the orifice, the bracket allowing the translational immobilisation of the body with respect to the vehicle body when a rotation of the body about its axis brings it from its mounting position to its locking position and effects the gripping of the wall between the abutment surface, the elastic means and the bracket.

Many examples of arrangements for fixing a hydraulic control cylinder with a tubular axial shape overall to a body structure element of a motor vehicle are known.

First of all conventional arrangements are known, in which the control cylinder is fixed directly to a bulkhead on the vehicle, for example by studs, screws or nuts.

The arrangements of this type have the advantage of using control cylinders which are simple in shape, and therefore inexpensive to produce by casting.

However, these mountings are constraining, the mounting of a control cylinder of the abovementioned type requiring good coaxiality of the anchoring points on the control cylinder and the holes in the bulkhead.

To resolve this drawback, mountings of the type previously described have been conceived, often referred to as "bayonet" mountings, which allow a rapid mounting or demounting of the control cylinder in the body structure element in the vehicle, notably the vehicle bulkhead.

The document GB-B-2.163.475 describes an arrangement of this type in which the control cylinder has three brackets which simultaneously effect the translational immobilisation and the rotational immobilisation of the control cylinder.

To this end, the control cylinder has a U-shaped elastic pin which is slipped radially onto two parallel countersinks on the cylinder body, which is in abutment on a front face of the support and in abutment on a rear face of a radial collar on the body of the control cylinder. The control cylinder also has three brackets uniformly distributed angularly, whose front faces have teeth which are intended to cooperate with notches on a rear face of the support, when the elastic pin axially acts on the body of the control cylinder.

This arrangement has the drawback of requiring a suitable angular positioning of the teeth on the cylinder opposite the notches in the support, which makes mounting tricky.

In addition, the particular shape of the brackets requires a mould with a particularly complex shape and an expensive casting process, the surface state of the teeth being necessary to a good positioning of the control cylinder with respect to the vehicle bulkhead.

SUMMARY OF THE INVENTION

To remedy this drawback, the invention proposes a control cylinder arrangement in which the means of translational immobilisation and the means of rotational immobilisation are independent of each other.

To this end, the invention proposes an arrangement of the type described previously, characterised in that means of rotationally immobilising the body with respect to the wall include a dish, which is fixed with respect to rotation to the body, which is interposed between the axial elastic means and the wall, and which has at least one stud which extends axially through the orifice in the wall in order to come into abutment against the wall when the body is brought in rotation from its mounting position to its locking position, and include at least one tooth, fixed with respect to rotation to the body, which extends axially at the edge of the body in order to bite into the wall when the body is brought in rotation from its mounting position to its locking position, and to immobilise the body in the locking position.

According to other characteristics of the invention:

- the body has at its periphery at least one bracket, which is associated with a complementary cutout in the orifice, the dish has a cylindrical shape overall, and has a rear transverse wall, which has a circular orifice and a cutout, identical to that in the body, to enable it to be mounted on the body,
- the dish has a rectilinear ridge arranged tangentially to the edge of its circular orifice, and which is intended to cooperate with a complementary flat, arranged on the periphery of the body, to fix the dish to the body with respect to rotation,
- the stud is arranged on a rear face of the rear transverse wall of the dish, at the edge of a substantially radial ridge on the cutout,
- the dish is produced by moulding from a plastics material,
- the dish is produced by pressing from a metal sheet,
- the stud is formed by an axial fold in the sheet metal of the dish and is oriented towards the rear,
- the tooth extends from a front face of the bracket on the body,
- the tooth is carried by the rear face of the rear transverse wall of the dish,
- the tooth is formed by an axial fold in the metal sheet of the dish, which is arranged at the edge of the cutout, and which is oriented towards the rear,
- the abutment surface of the body forms part of a radial annular collar,
- the elastic means include an elastic washer which bears on a rear face of the collar and on a front internal face of the dish,
- the dish is able to slide on the body between two extreme positions, a first front position in which the front internal face of the dish is acted on by the elastic washer, and a second rear abutment position in which a radial protrusion, carried by an internal wall of the dish, extends in the direction of the axis of the cylinder in order to immobilise the dish nesting on the collar,
- the wall is carried by a support which is arranged opposite an opening formed in the body structure element, and has two lugs with holes at their ends, which enable the support to be mounted on the body structure element by screwing, the body has at its periphery at least two brackets of different shapes, uniformly distributed, which are associated with at least two complementary cutouts in the orifice, to allow angular location of the body when it is inserted in the orifice, the rectilinear ridge connects together two consecutive cutouts in their area of junction with the orifice.

BRIEF DESCRIPTION OF THE DRAWINGS

Other characteristics and advantages of the invention will emerge from a reading of the following detailed description, for an understanding of which reference should be made to the accompanying drawings, in which:

FIG. 9 is a perspective view of a corrugated elastic washer for a second embodiment of the control cylinder according to the invention;

FIG. 10 is a perspective view of an elastic washer made from wire arched and split for the first embodiment of the control cylinder according to the invention;

FIG. 11 is a perspective view of an elastic washer made of elastomer material for the first embodiment of a control cylinder according to the invention;

FIG. 12 is a perspective view of a split elastic washer for the first embodiment of the control cylinder according to the invention;

FIG. 13 is a perspective view of a dish made of plastics material for the second embodiment of the control cylinder according to the invention;

FIG. 14 is a detail view in axial section illustrating the mounting of the control cylinder according to the second embodiment of the invention.

DETAILED DESCRIPTION OF THE PREFERRED EMBODIMENTS

Figure 1:
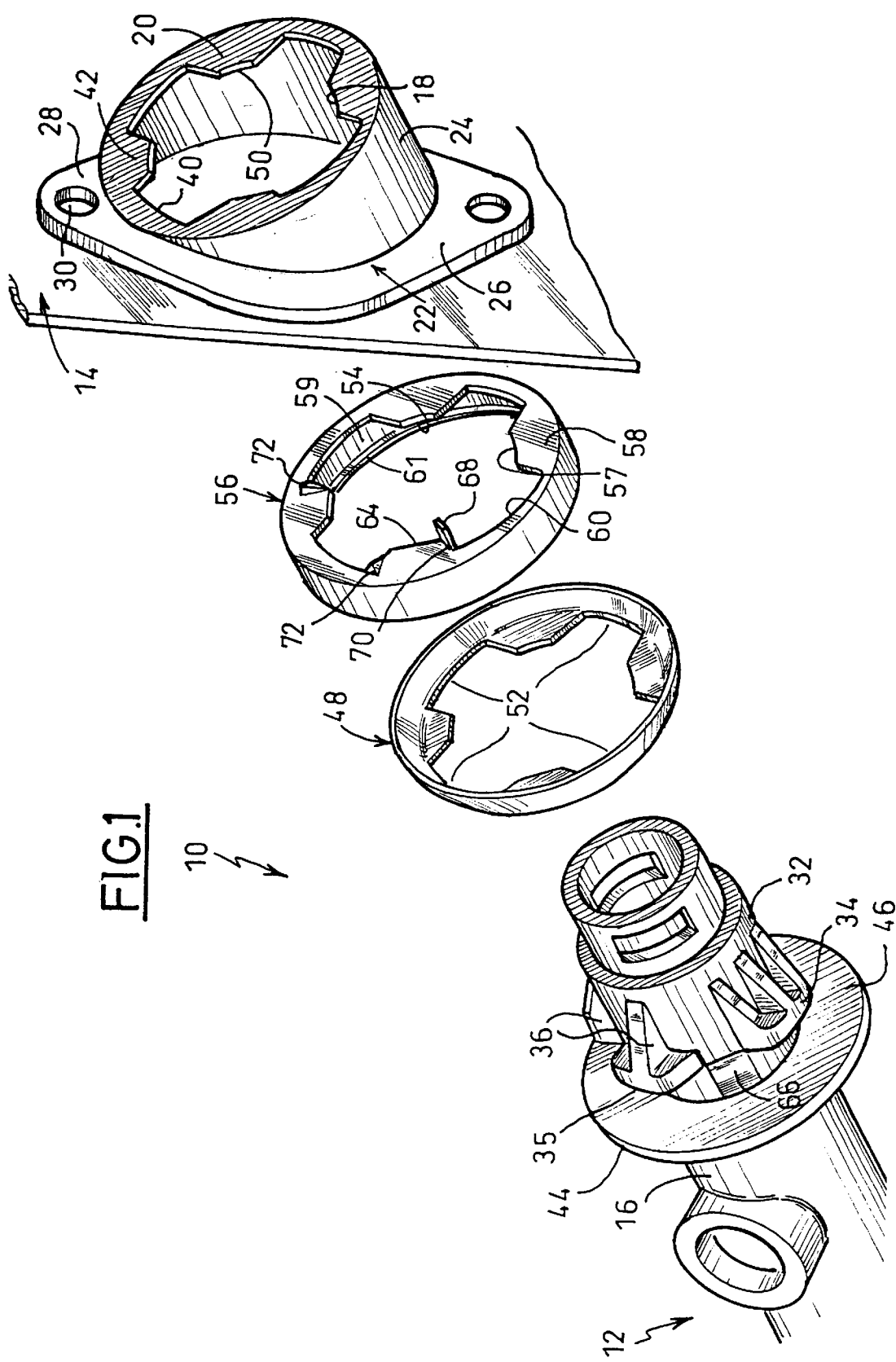
FIG. 1 is an exploded perspective view of an arrangement according to the invention.

In the description which follows, identical reference numerals designate identical parts or those having similar functions.

In FIG. 1 the whole of an arrangement 10 for fixing a hydraulic control cylinder 12 to a body structure element 14, notably a bulkhead, of a motor vehicle (not shown) can be seen. The element 14 is fixed.

In a known fashion, the control cylinder 12 has a body 16 with a tubular axial shape overall produced for example by casting a metallic material or moulding a plastics material.

In a known fashion, the body 16 of the control cylinder 12 is intended to be mounted through an orifice 18 in a wall 20 which is fixed to the body structure element 14 of the vehicle. The wall 20 can be made in one piece with the body structure element 14, as is the case, for example, when the wall 20 forms part of a vehicle bulkhead.

However, in the preferred embodiment of the invention, the wall 20 belongs to a support 22 fixed to the body structure element 14 of the vehicle.

To this end, the support 22 has a substantially cylindrical body 24 intended to receive the control cylinder 12, and a flat base 26, which has two lugs 28 each with, at their end, axial holes 30 intended to allow passage of screws (not shown) for fixing to the vehicle bulkhead 14.

The cylinder 12 is able to move between a position of mounting in the support 22, and a position of locking in the support 22.

Figure 5:
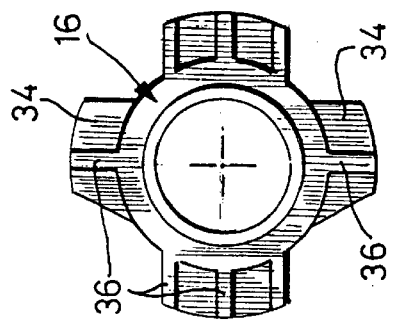
FIG. 5 is an end view of a control cylinder according to the invention.
Figure 3:
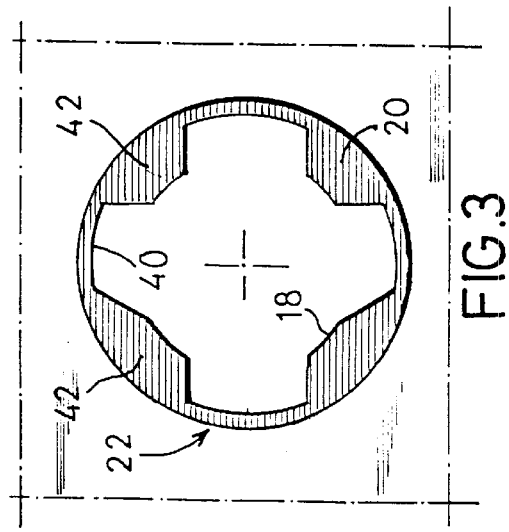
FIG. 3 is an end view of the cutouts of the orifice in the support according to the invention.

In a known manner, the body 16 of the cylinder 12 has at its rear end 32 at least one transverse bracket 34 which is intended, as will be seen subsequently, to allow the fixing of the control cylinder 12 in the support 22. In the preferred embodiment of the invention, and non-limitatively of the invention, the body 16 has four brackets 34, regularly distributed angularly, and which are made in the one piece with the cylinder 12. Good mechanical strength of the brackets 34 with respect to the body 16 made of castable material is advantageously ensured by ribs 36 which extend between rear faces 38 of the brackets 34 and the periphery of the body 16. The brackets 34 and their ribs 36 are also depicted in FIG. 5, which illustrates the body 16 of the cylinder 12, here based on fiber-reinforced plastics material When mounting, the cylinder 12 is first of all engaged from front to rear so that the brackets 34 pass through cutouts 40 in the orifice 18, which have a shape complementary to the brackets 34. The orifice 18, enlarged by the cutouts 40, therefore has substantially the shape of a four-pointed star. Advantageously, as depicted in FIGS. 1 and 5, the brackets 34 are each different from each other, and the same applies to the associated cutouts 40 in the support 22, visible in FIG. 3. This arrangement gives rise, on mounting, to a single possible angular orientation of the cylinder 12 with respect to the support 22, which is particularly advantageous for the positioning of any connections which may be made to the cylinder 12 during the remainder of the assembly of the vehicle. This is because, the cylinder 12 being intended to be connected to different hydraulic pipes in the vehicle, the definition of its angular position and mounting must be clearly defined so that a correct connection of the pipes can be made.

On mounting, the body 16 and brackets 34 pass from front to rear through the cutouts 40 in the orifice 18, and then the body 16 is pivoted about its axis by approximately one eighth of a turn. The body 16 is elastically returned towards the rear, so that, after this rotation of the body 16, the brackets come into abutment by means of their front faces 35 on the material returns 42 arranged on the support 22 between the cutouts 40 in the orifice 18.

Figure 2:
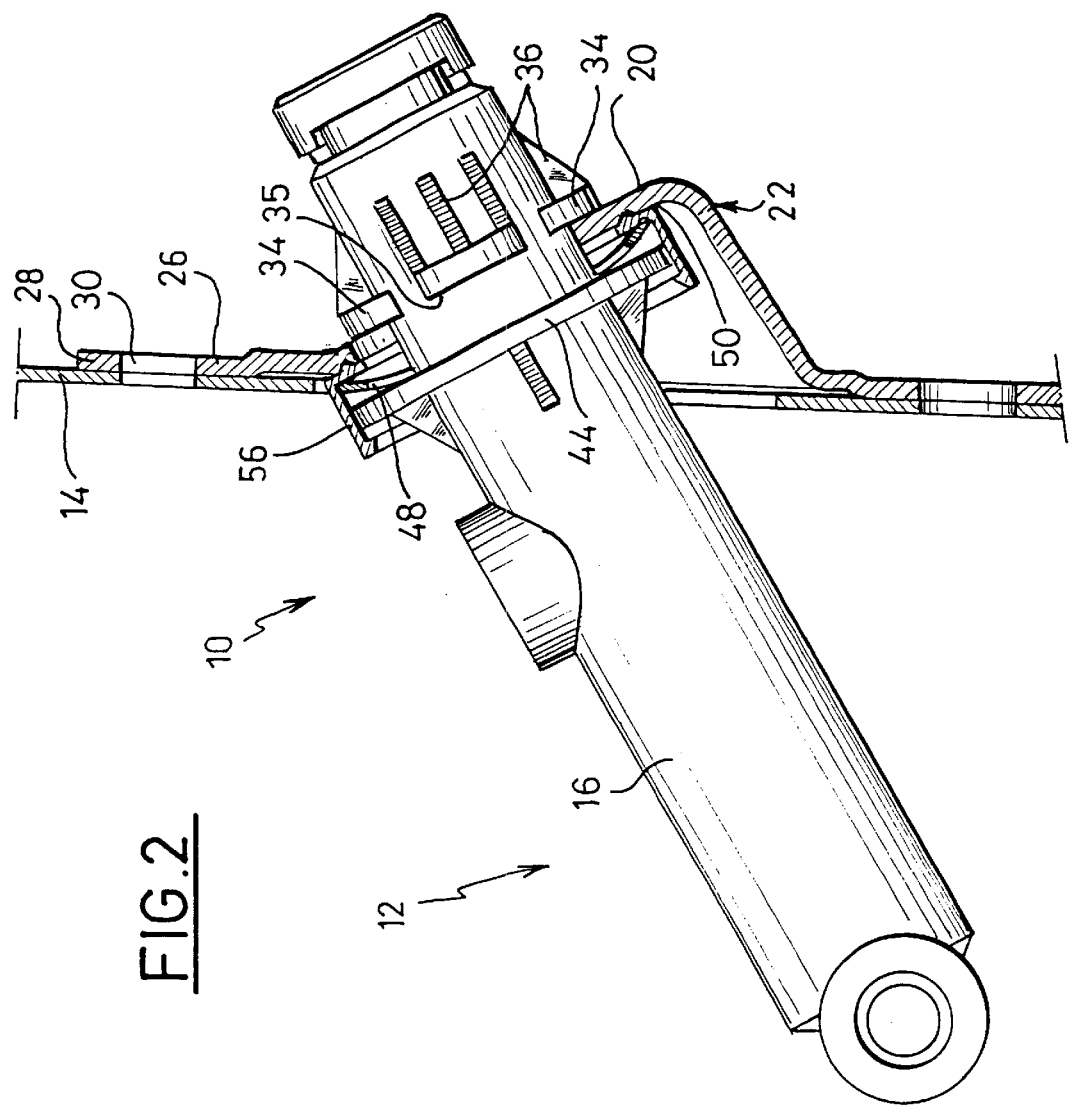
FIG. 2 is a side view of an arrangement according to FIG. 1 depicted assembled.

For this purpose, the body has a collar 44, which extends radially in front of the brackets 34, and which has a diameter greater than the radial dimension of the brackets 34, so that it can provide a support surface, formed by a rear face 46, for an elastic washer 48, which is interposed before mounting between the collar 44 and the support 22, which is also depicted in FIG. 2.

The elastic washer 48 has four cutouts 52 complementary to the brackets 34, to enable it to come into abutment on the rear face 46 of the collar 44 after having the brackets 34 of the body 16 pass through it. Advantageously, the washer 48 is a tapered elastic washer of the "Belleville" type, depicted in FIG. 1, but can also be a corrugated elastic washer of the "Onduflex" type, depicted in FIG. 9, a washer made of arched and split wire, depicted in FIG. 10, a washer made of elastomer material, depicted in FIG. 11, or a split washer, depicted in FIG. 12. The details of these washers will be described subsequently.

When the cylinder 12 is brought into the mounting position, the washer 48 is compressed between the rear face 46 of the collar 44 and a rear face 54 of a dish 56 interposed between the washer 48 and the support 22.

Figure 4:
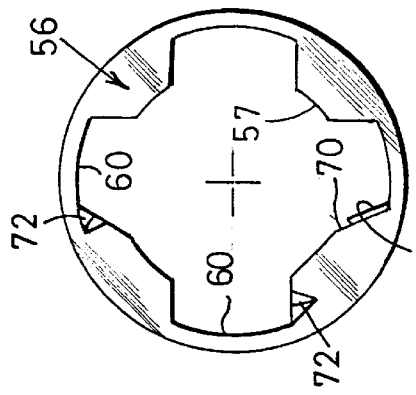
FIG. 4 is an end view of a dish according to the invention.

The dish 56 is a dish made of pressed sheet metal or a plastics material, substantially cylindrical in shape, a rear transverse wall 58 of which also has a circular orifice 69 and four cutouts 60, and which is intended to be slipped axially onto the body 16 of the cylinder 12 and onto the washer 48. The dish 56 is depicted in FIGS. 1 and 4. The dish 56 has a diameter greater than that of the washer 48, so that, when the washer 48 and dish 56 are slipped axially from rear to front onto the body 16 of the cylinder 12, the washer 48 is received in the dish 56.

The dish 56 has an inside diameter substantially equal to the outside diameter of the collar 44 of the body 16 and has, on its internal wall 59, a protrusion 61, which extends radially towards the inside, to enable the dish 56 to nest on the collar 44. In this way, the dish 56 is able to move axially with respect to the body 16 between two axial stop positions, a front position in which its rear face 54 is in abutment against the washer 48 when it is compressed, and a rear position in which the protrusion 61 holds the dish on the collar 44, the washer 48 being relaxed.

Figure 7:
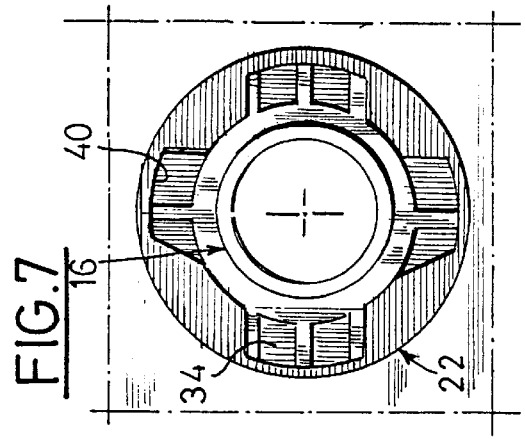
FIG. 7 is an end view illustrating a control cylinder according to the invention during its engagement in the orifice.
Figure 6:
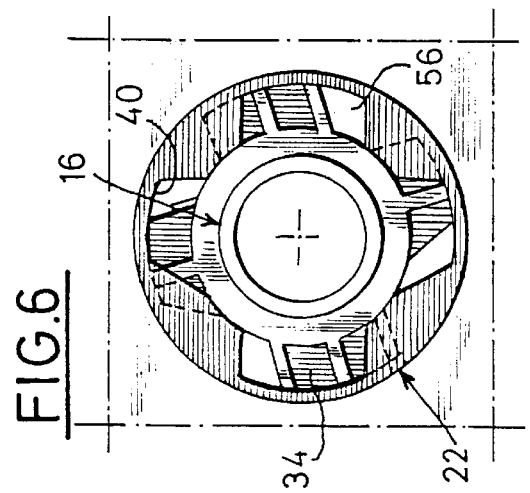
FIG. 6 is an end view illustrating a control cylinder according to the invention with its engagement through the orifice.
Figure 15:
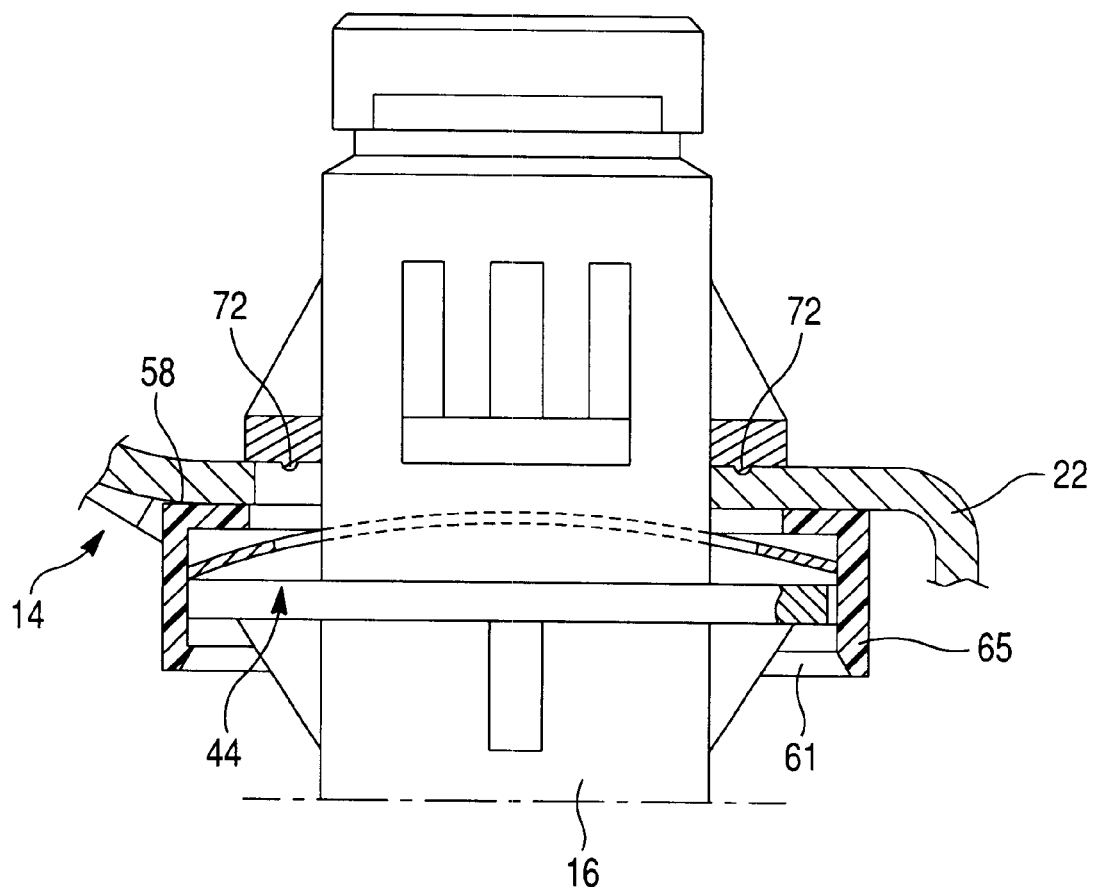
FIG. 15 is a detail view in axial section illustrating the mounting of the control cylinder wherein the tooth extends from the bracket toward the abutment surface.

On mounting, the body 16, provided with the elastic washer 48 and the dish 56, depicted in FIG. 1, is presented opposite the cutouts 40 in the support 22 and then inserted from front to rear in the support 22. FIG. 6 illustrates a non-conforming position of the body 16 with respect to the cutouts 40 which prevents its being mounted in the support 22. A correct insertion position is depicted in FIG. 7. The dish 56 comes into abutment against the rear face 50 of the support 22, depicted in FIG. 1, and compresses the elastic washer 48. A rotation of the body 16 makes it possible to bring it from its mounting position to its axial locking position, in which the front faces 35 of the brackets 34 are in abutment on the rear face of the transverse wall 20 of the support 22, under the action of the return force exerted by the elastic washer 48 on the collar 44 of the body 16, which is held by the dish 56.

Figure 8:
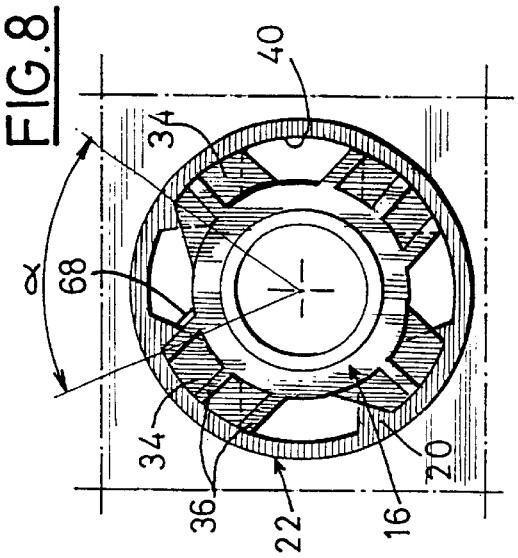
FIG. 8 is an end view illustrating a control cylinder according to the invention after its engagement in the orifice and after its rotation.

This configuration in axial locking is more particularly described with reference to FIG. 2. FIG. 8 illustrates in detail the angular positioning of the brackets 34 of the body 16 on the rear transverse face of the wall 20, between two cutouts 40 in the support 22.

The axial holding of the cylinder 12 in the support 22 is provided as long as the brackets 34 occupy an appropriate angular position, each of them being positioned between two cutouts 40 in the support 22. The determination of this position being particularly important, the arrangement 10 has for this purpose means of rotationally immobilising the body 16 with respect to the support 22.

In accordance with a preferred embodiment of the invention, the dish 56 is rotationally fixed with respect to the body 16 of the cylinder 12. As can be seen in FIGS. 1 and 4, an additional rectilinear ridge 64 connects two cutouts 60 in the dish 56, substantially along a tangent to the circular orifice 57. The body 16 has a flat 66 arranged between the two brackets 34 complementary to the relevant cutouts 60 in the dish 56, so that, when the dish 56 is slipped axially onto the body 16, the ridge 64 is in linear contact with the flat 66. The dish 56 is thus rotationally connected to the body 16.

Advantageously, the flat 66 on the body 16 is a shape resulting directly from the process of casting of the cylinder 12. In addition, since producing the flat 66 in the body 16 corresponds to a reduction in the diameter of the cylindrical body 16 in the associated transverse plane, this arrangement makes it possible to refrain from producing similar rectilinear ridges in the elastic washer 48 and in the support 22, which simplifies the shapes of the latter parts, and therefore reduces their manufacturing cost.

The dish 56 has, on its rear face 58, an axial stud 68, which is described with reference to FIGS. 1 and 4. The axial stud 68 extends towards the rear and is arranged on a radial edge 70 of a cutout 60. The axial stud 68 is slightly offset angularly towards the inside of the relevant cutout 60, so that it is able, when the body 16 provided with the washer 48 and the dish 56 is inserted into the support 22, to pass through the orifice 18 in the support 22. The axial stud 16 is arranged on an edge 70 of the cutout 60 which is chosen so as, between the mounting position and the locking position, to travel an entire width of a cutout 40 in the support 22 without encountering the wall 20 of the support 22, so that it makes it possible to define an annular rotational travel of the cylinder 12 corresponding to an angular difference a between two edges of the same cutout 60, the axial stud 68 coming into abutment against a radial edge the cutout 40 of the wall 20 of the support 22 at the end of angular travel of the cylinder 12. This travel α is particularly depicted in FIG. 8, the direction of rotation of the cylinder 12 being illustrated by the arrow.

The cylinder 12 has additional means of immobilising with respect to rotation, which enable the body 16 to keep its angular abutment position against the support 22. This is because, in the preferred embodiment of the invention, the dish 56 has teeth 72 carried by its rear face 58. The teeth 72 are depicted in FIGS. 1 and 4. The teeth 72 extend axially towards the rear in order to bite into the front face 50 of the support 22 and prevent rotation of the cylinder 12 in the reverse direction to locking. Advantageously, in the preferred embodiment of the invention, the teeth 72 are produced by folding the metal sheet from which the dish 56 is produced, and for this reason are preferably arranged at the edge of one or more cutouts 60. Advantageously the teeth 72 form an acute angle (not shown) with the rear face 58 of the dish 56, the apex of this angle being turned in the direction of rotation of locking of the cylinder, in order to assist locking and prevent accidental unlocking.

In a variant (not shown) the teeth 72 can be carried in a similar fashion by the front faces 35 of the brackets 34 of the body 16. In this case, the teeth 72 are made in one piece with the material of the cylinder 12.

However, all these arrangements are not restrictive of the invention.

The dish 56 can be produced from plastics material, and in this configuration all the functional forms of the dish 56 are obtained by moulding. FIG. 13 illustrates a dish 56 produced by moulding according to a second embodiment of the invention. In a similar manner to the previous embodiment, the dish 56 carries the teeth, stud and cutouts (not shown) on its rear face 58, and the protrusion 61 allowing on mounting, as depicted in FIG. 14, its axial immobilisation with respect to the collar 44 on the body 16 of the cylinder 12. The teeth 72 are, according to this second embodiment of the invention, produced in one piece with the plastics material of the dish 56, and disposed for example on the rear face 58 of the dish 56 between two cutouts 60 or, in a variant (not shown), on the periphery of the rear face 58.

FIGS. 13 and 14 also illustrate an embodiment as a variant of the rotational fixing of the dish 56 to the body 16. This is because, in this case, the dish 56 does not have a ridge 64, the body 16 does not have a flat 66, and the rotational fixing of the body 16 and dish 56 is advantageously effected by means of an axial catch 65 which is arranged radially inside the wall 59 of the dish 56 and is intended to cooperate with a complementary scallop 67, arranged radially on the collar 44 of the body 16.

This connection is depicted in FIG. 14. The catch 65 is produced in one piece with the plastics material of the dish 56. The dish 56 is elastically returned by a suitable washer 48, which has a recess 63 allowing the passage of the catch 65 through the washer 48. Such a washer is depicted more particularly in FIG. 9.

The design of the catch 65 is not limitative of the invention, and such a rotational fixing could, non-limitatively of the invention, be associated with the first embodiment of the dish 56, the catch then being formed by an axial fold (not shown) in the metal sheet of the front face 58 of the dish 56.

Moreover, as illustrated by FIG. 14, the plastic dish 56 is advantageously slightly deformable and, on mounting, deforms axially in abutment against the support 22 so that the periphery of its rear face 58 is in contact with the support 22 and thus provides a seal between the areas A and B of the vehicle delimited by the body structure element 14 of the vehicle, that is to say here the support 22. In addition, the protrusion 61 is radially elastic, so that, when the dish 56 is in abutment through its rear face 58 on the support 22, the elastic mounting of the protrusion 61 on the collar 44 also participates in the seal between the areas A and B of the vehicle.

FIGS. 9 to 12 illustrate various variants of washers 48 for producing axial elastic means according to the invention.

FIG. 9 illustrates a corrugated washer 48, also referred to as an "Onduflex" washer. The washer 48 depicted is associated with a second method of rotational fixing of the dish 56 to the body 16, since it includes the recess 63 intended to allow passage of the catch 65 described above with reference to FIGS. 13 and 14. However, non-limitatively of the invention, such a washer 48 could be associated with the first method of rotationally fixing the dish 56 to the body 16. In this case (not shown), it would not have a recess 63, but only cutouts 52 similar to those described with reference to FIG. 1. Axial corrugations 69 in the washer 48 would give it its axial elasticity.

FIG. 10 depicts an elastic washer made of arched and split wire for the first embodiment of rotational fixing of the dish 56 to the body 16. The washer 48 is similar to a turn on a helical spring, and is mounted on the body 16 of the cylinder 12 depicted in FIG. 1, by separating its arms 71. Advantageously, such a washer could also be used for the second embodiment of rotational connection of the dish 56 to the body 16.

FIG. 11 depicts an elastic washer made from an elastomer material for the first embodiment of rotational fixing of the dish 56 to the body 16. The washer 48 is produced from an elastomer material and is mounted on the body 16 whilst deforming radially. Advantageously, a washer of this type could also be used for the second embodiment of rotational fixing of the dish 56 to the body 16. In this case it would have a recess similar to the recess 63 in the washer described in FIG. 9.

FIG. 12 illustrates a split elastic washer for the first embodiment of rotational fixing of the dish 56 to the body 16. The washer 48 is mounted on the body 16 of the cylinder 12 depicted in FIG. 1, by separation of its arms 73. Advantageously, a washer 48 of this type could also be used for the second embodiment of rotational fixing of the dish 56 to the body 16. In this case, it would have a recess similar to the recess 63 in the washer described in FIG. 9.

Advantageously, the arrangement 10 makes it possible to obtain a rapid fixing of a hydraulic cylinder 12 in the bulkhead of a vehicle. This arrangement 10 is all the more advantageous since it does not require any particular tool, unlike fixings with conventional screws, and is easily demountable. This is because it suffices to exert a high torque in the opposite direction to the locking on the cylinder 12 in order to overcome the opposing reaction force of the teeth 72 and allow easy demounting of the cylinder 12.

What is claimed is:

1. Arrangement (10) for the fixing, to a body structure element (14) of a motor vehicle, of a hydraulic control cylinder (12) with a tubular axial shape overall, notably for controlling a clutch or brakes on the vehicle, of the type in which the control cylinder (12) is movable between a position of mounting in the body structure element (14) of the vehicle, and a position of locking with respect to the body structure element (14) of the vehicle in which it is immobilized with respect to the body structure element (14) of the vehicle by immobilization means, of the type in which means of immobilizing it with respect to translation along the axis of the cylinder (12) include, from front to rear, an abutment surface which extends transversely from a main body (16) of the cylinder (12), axial elastic means, a wall (20) fixed to the body structure element (14) which has it in an orifice (18), and at least one bracket (34), which extends transversely from the main body (16), which, on mounting, passes through a complementary cutout (40) extending radially from the orifice (18), the bracket allowing the translational immobilization of the body (16) with respect to the vehicle body when a rotation of the body (16) about its axis brings it from its mounting position to its locking position and effects the gripping of the wall (20) between the abutment surface (46), the elastic means and the bracket (34), wherein means of rotationally immobilizing the body (16) with respect to the wall (20) include a dish (56), which is fixed with respect to rotation to the body (16), which is interposed between the axial elastic means and the wall (20), and which has at least one stud (68) which extends axially through the orifice (18) in the wall in order to come into abutment against the wall (20) when the body (16) is brought in rotation from its mounting position to its locking position, and include at least one tooth (72), fixed with respect to rotation to the body (16), which extends axially at the edge of the body (16) in order to bite into the wall (20) when the body (16) is brought in rotation from its mounting position to its locking position, and to immobilize the body (16) in the locking position.

2. Arrangement (10) according to claim 1, characterized in that the dish (56) has a cylindrical shape overall, and has a rear transverse wall (58), which has a circular orifice (57) and a cutout (60), identical to that in the body (16), to enable it to be mounted on the body (16).

3. Arrangement (10) according to claim 2, characterized in that the dish (56) has a rectilinear ridge (64) arranged tangentially to the edge of its circular orifice (57), and which is intended to cooperate with a complementary flat (66), arranged on the periphery of the body (16), to fix the dish (56) to the body (16) with respect to rotation.

4. Arrangement (10) according to claim 3, characterized in that the rectilinear ridge (64) connects together two consecutive cutouts (60) in their area of junction with the orifice (57).

5. Arrangement (10) according to claim 2 characterized in that the stud (68) is arranged on a rear face of the rear transverse wall (58) of the dish (56), at the edge of a substantially radial ridge (70) on the cutout (60).

6. Arrangement (10) according to claim 1, characterized in that the dish (56) is produced by moulding from a plastics material.

7. Arrangement (10) according to claim 1, characterized in that the dish (56) is produced by pressing from a metal sheet.

8. Arrangement (10) according to claim 7, characterized in that the stud (68) is formed by an axial fold in the sheet metal of the dish (56) and is oriented towards the rear.

9. Arrangement (10) according to claim 7, characterized in that the tooth (72) is carried by the rear face of the rear transverse wall (58) of the dish (56).

10. Arrangement (10) according to claim 9, characterized in that the tooth (72) is formed by an axial fold in the metal sheet of the dish (56), which is arranged at the edge of the cutout (60), and which is oriented towards the rear.

11. Arrangement (10) according to claim 1, characterized in that the tooth (72) extends from a front face of the bracket (34) on the body (16) toward said abutment surface which extends transversely from said main body (16) of the cylinder (12).

12. Arrangement (10) according to claim 1, characterized in that the abutment surface of the body (16) forms part of a radial annular collar (44).

13. Arrangement according to claim 12, characterized in that the elastic means include an elastic washer (48) which bears on a rear face (46) of the collar (44) and on a front internal face (54) of the dish (56).

14. Arrangement (100 according to claim 13, characterized in that the dish (56) is able to slide on the body (16) between two extreme positions, a first front position in which the front internal face (54) of the dish (56) is acted on by the elastic washer (48), and a second rear abutment position in which a radial protrusion (61), carried by an internal wall (59) of the dish (56), extends in the direction of the axis of the cylinder (12) in order to immobilize the dish (56) nesting on the collar (44).

15. Arrangement (10) according to claim 1, characterized in that the wall (20) is carried by a support (22) which is arranged opposite an opening formed in the body structure element (14), and has two lugs (28) with holes at their ends, which enable the support (22) to be mounted on the body structure element (14) by screwing.

16. Arrangement (10) according to claim 1, characterized in that the body (16) has at its periphery at least two brackets (34) of different shapes, uniformly distributed, which are associated with at least two complementary cutouts (40) in the orifice (18), to allow angular location of the body (16) when it is inserted in the orifice (18).

* * * * *